(12) United States Patent
Asaoka

(10) Patent No.: US 8,047,960 B2
(45) Date of Patent: Nov. 1, 2011

(54) CONTINUOUSLY VARIABLE TRANSMISSION AND STRADDLE TYPE VEHICLE

(75) Inventor: Ryousuke Asaoka, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1054 days.

(21) Appl. No.: 11/871,893

(22) Filed: Oct. 12, 2007

(65) Prior Publication Data

US 2008/0305926 A1 Dec. 11, 2008

(30) Foreign Application Priority Data

Oct. 13, 2006 (JP) ................................. 2006-280019
Sep. 6, 2007 (JP) ................................. 2007-231759

(51) Int. Cl.
*F16H 61/662* (2006.01)
*F16H 59/20* (2006.01)
(52) U.S. Cl. ........................................ 477/43; 477/141
(58) Field of Classification Search .................... 477/43, 477/120, 141
See application file for complete search history.

(56) References Cited

U.S. PATENT DOCUMENTS

| | | | |
|---|---|---|---|
| 5,514,046 A * | 5/1996 | Petersmann et al. | ............ 477/39 |
| 5,688,204 A | 11/1997 | Runge et al. | |
| 6,246,940 B1 | 6/2001 | Ochiai et al. | |
| 6,671,602 B1 | 12/2003 | Speicher et al. | |
| 2004/0097328 A1 * | 5/2004 | Makiyama et al. | ............. 477/43 |

FOREIGN PATENT DOCUMENTS

| | | |
|---|---|---|
| EP | 0890764 B1 | 10/2003 |
| EP | 1785647 A1 | 5/2007 |
| JP | 62-175228 | 7/1987 |
| JP | 04-131558 | 5/1992 |
| JP | 04-210156 | 7/1992 |
| JP | 04203665 A | 7/1992 |
| WO | 2006006506 A1 | 1/2006 |

OTHER PUBLICATIONS

European Search Report for corresponding European application No. 07254064.4 lists the references above.

* cited by examiner

*Primary Examiner* — Edwin A Young
(74) *Attorney, Agent, or Firm* — Rabin & Berdo, PC

(57) ABSTRACT

A continuously variable transmission reduces slips between a primary sheave and a V-belt when decelerating. A target value setting section sets a control target value for control by a control device. In the target value setting section, a normal mode, a kick down mode set to be in a Low gear range lower than in the normal mode, and a restriction value given in a throttle fully closed state are provided. The control device controls the continuously variable transmission based upon the kick down mode provided in the target value setting section, in response to an operation of a kick down operator. The control device controls a gear ratio of the continuously variable transmission not to vary to a Low gear range lower than the restriction value provided in the target value setting section.

12 Claims, 8 Drawing Sheets

CONTINUOUSLY VARIABLE TRANSMISSION AND STRADDLE TYPE VEHICLE

RELATED APPLICATIONS

This application claims the benefit of priority under 35 USC 119 of Japanese patent application nos. 2006-280019, filed on Oct. 13, 2006, and 2007-231759, filed on Sep. 6, 2007, which applications are hereby incorporated by reference in their entireties.

BACKGROUND OF THE INVENTION

1. Field of the Invention

The present invention relates to a continuously variable transmission for a straddle type vehicle.

2. Description of Related Art

V-belt type continuously variable transmissions are widely used in straddle type vehicles such as scooter type motorcycles. A conventional V-belt type continuously variable transmission has paired primary and secondary sheaves having grooves whose widths are variable, and that are respectively provided for a primary shaft to which an output of a drive power source such as an engine is inputted and for a secondary shaft from which an output to a drive wheel is taken. By a V-belt being wound around both sheaves and the groove widths of the respective sheaves being changed by a groove width adjusting mechanism, wind diameters relative to the sheaves are adjusted and a gear ratio between both sheaves is continuously adjusted.

Typically, the primary and secondary sheaves are structured with a fixed flange and a movable flange forming a V-groove therebetween. The movable flanges are movably provided in an axial direction of the primary or secondary shaft. Thus, the gear ratio can be continuously adjusted by moving the movable flanges by the groove width adjusting mechanism.

In one V-belt type continuously variable transmission, the movable flange of the primary sheave is moved by an electrically operated motor. The movable flange is moved in both directions using the moving thrust of the electrically operated motor, i.e., in a direction in which the groove width is narrowed (in a Top gear range) and in another direction in which the groove width is widened (in a Low gear range). Accordingly, the groove width is freely adjustable (for example, see JP-B-3043061).

In a scooter type motorcycle having an electronically controlled V-belt type automatic continuously variable transmission, the gear ratio is automatically changed without a rider's operation (for example, JP-A-Sho 62-175228). Predetermined programs (maps) are executed and the gear ratio is automatically changed based upon information such as vehicle speed, engine rotational speed and acceleration opening. Therefore, the driving operation of the rider is made easier.

In motorcycles having automatic continuously variable transmissions, a speed reduction lever for setting the gear ratio of the continuously variable transmission (for example, see JP-B-2950957), and a switch for compulsorily changing the gear ratio or manually shifting down (engine braking) (see JP-A-Sho 62-175228), are also known. Any gear ratio can thereby be freely and continuously obtained with the rider's intention while also enjoying the advantages of the automatic continuously variable transmission. Application of the engine brake to the driving and previous shift down movements thus can be made, and the slow start of acceleration can be resolved.

In developing a V-belt type continuously variable transmission having a control program (kick down mode) that realizes a shift down movement in accordance with the rider's intention, the inventors analyzed various running conditions, and found a problem that slips can occur between the primary sheave and the V-belt under a deceleration condition when the kick down mode is executed.

SUMMARY OF THE INVENTION

The present invention addresses this problem. A continuously variable transmission according to the present invention has a gear ratio that is controlled by a control device, and includes a kick down operator. The control device provides a normal mode in which a control target value is set, a kick down mode in which the control target value is set to be in a Low gear range lower than in the normal mode, and a restriction value is given in a throttle fully closed state. The control device controls the continuously variable transmission based upon the kick down mode in response to an operation of a kick down operator, and controls the continuously variable transmission not to vary to a Low gear range lower than the restriction value given in the throttle fully closed state.

A straddle type vehicle according to the present invention includes an engine whose output is controlled in response to operation of an acceleration operator, a continuously variable transmission connected to the engine, and a control device electronically controlling a gear ratio of the continuously variable transmission. The straddle type vehicle includes a kick down operator provided separately from the acceleration operator. The control device provides a normal mode in which a control target value is set, a kick down mode in which the control target value is set to be in a Low gear range lower than in the normal mode, and a restriction value in a throttle fully closed state. The control device controls the continuously variable transmission based upon the kick down mode in response to an operation of the kick down operator, and controls the continuously variable transmission not to vary to a Low gear range lower than the restriction value in the throttle fully closed state.

In the throttle fully closed state, for example, the control device can control the continuously variable transmission along the restriction value, when the kick down mode sets the control target value to a Low gear range lower than the restriction value.

If the continuously variable transmission includes a clutch which is disengaged at a preset speed, the restriction value given in the throttle fully closed state is preferably set to be generally identical with the control target value set in the normal mode in the throttle fully closed state, in the vicinity of a vehicle speed at which the clutch is disengaged.

If the kick down mode has multiple stages at which control target values are sequentially set at Low gear positions lower than in the normal mode, the control device sequentially executes each stage of the kick down mode set at one of the Low gear positions in response to the operation of the kick down operator. In this situation, in the throttle fully closed state, the control device restricts the kick down control, when the control target value set by the kick down mode is in a Low gear range lower than the restriction value.

If the kick down mode has multiple stages at which control target values are sequentially set at Low gear positions lower than in the normal mode, the control device sequentially executes each stage in response to the operation of the kick down operator (kick down control). In this situation, in the throttle fully closed state, when the control target value set by the kick down mode is in a gear range lower than the restriction value, the control device restricts the kick down control and controls the gear ratio of the continuously variable transmission along the restriction value.

According to the invention, the normal mode, the kick down mode, and the restriction value are provided in a target value setting section. The control device controls the gear ratio of the continuously variable transmission based upon the kick down mode, in response to an operation of the kick down operator, and, in the throttle fully closed state, controls the gear ratio not to exceed the restriction value. Thereby, the gear ratio in the throttle fully closed state is properly controlled even when the kick down mode is executed, and the problem of slips occurring between the primary sheave and the V-belt is resolved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

A continuously variable transmission of a straddle type vehicle according to an embodiment of the present invention is now described with reference to the drawings. The invention is not limited to the following embodiment.

Figure 1:
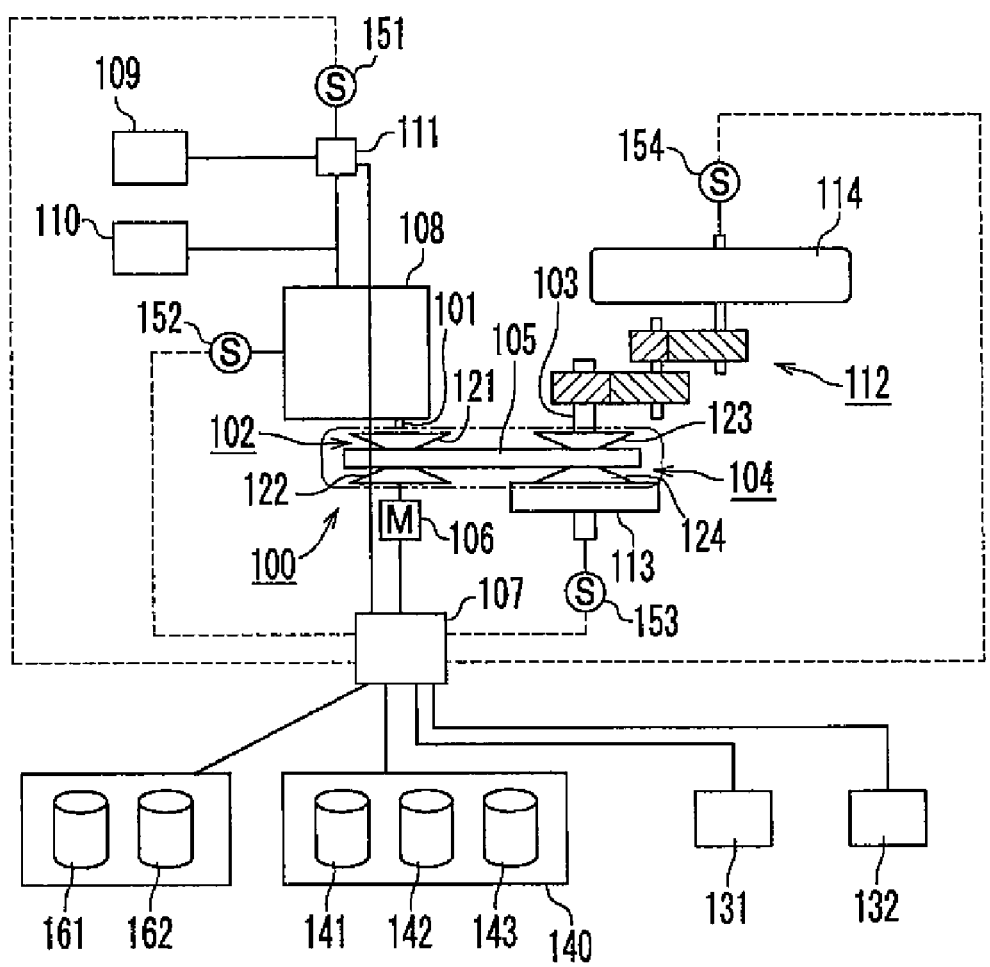
FIG. 1 is a block diagram of a continuously variable transmission according to one embodiment of the present invention.
Figure 2:
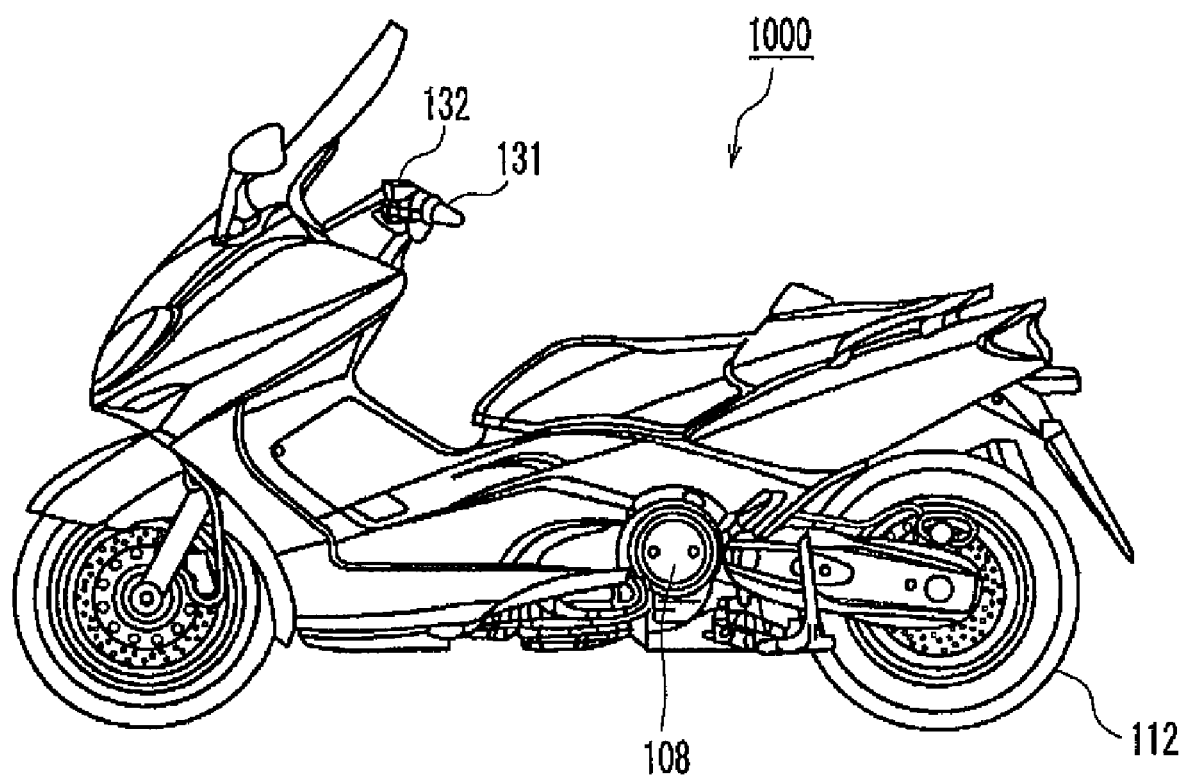
FIG. 2 is a side view of a straddle type vehicle according to one embodiment of the present invention.

A general structure of continuously variable transmission 100 is shown in FIG. 1. Continuously variable transmission 100 comprises a primary shaft (crankshaft) 101, a primary sheave 102, a secondary shaft 103, a secondary sheave 104, a V-belt 105, an actuator (motor) 106 and a control device 107. As shown in FIG. 2, continuously variable transmission 100 is mounted to a straddle type vehicle 1000. Reference numerals 108, 109, 110, 111, 112, 113 and 114 of FIG. 1 indicate an engine, a fuel tank, an intake box, a throttle valve, a speed reduction mechanism, a clutch and a drive wheel, respectively. Driving force generated by engine 108 is transmitted to drive (rear) wheel 114 through continuously variable transmission 100 and speed reduction mechanism 112. Clutch 113 is formed with a centrifugal clutch so that the driving power is not transmitted to secondary shaft 103 from continuously variable transmission 100 when a speed of the vehicle is slower than a generally constant vehicle speed under a deceleration condition.

Primary sheave 102 is mounted to primary shaft 101, a secondary sheave 104 is mounted to secondary shaft 103 and V-belt 105 is wound around primary sheave 102 and secondary sheave 104.

Primary sheave 102 is formed with a fixed flange 121 and a movable flange 122. A groove width of primary sheave 102 is adjusted by a motor 106 controlled by a control device 107. Secondary sheave 104 is formed with a fixed flange 123 and a movable flange 124, and a groove width thereof is adjusted to correspond to the groove width of primary sheave 102 by the action of an internally disposed spring.

Figure 3:
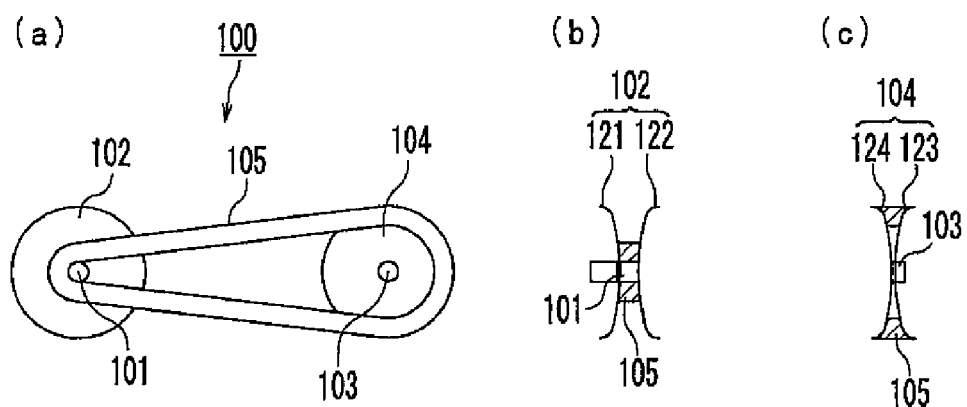
FIG. 3(a) shows the continuously variable transmission at a low gear position (Low)
FIG. 3(b) shows a primary sheave thereof.
FIG. 3(c) shows a secondary sheave thereof.

FIG. 3(a) shows continuously variable transmission 100 in a low gear (Low) state. In primary sheave 102, as shown in FIG. 3(b), a distance between fixed flange 121 and movable flange 122 is widened, and V-belt 105 is positioned at an inner circumferential location of primary sheave 102 (in the vicinity of primary shaft 101). In secondary sheave 104, as shown in FIG. 3(c), a distance between fixed flange 123 and movable flange 124 is narrowed, and V-belt 105 is positioned at an outer circumferential location of secondary sheave 104. Under this condition, the rotation of primary shaft 101 is decelerated and transmitted to secondary shaft 103. Continuously variable transmission 100 thus is in a state such that relatively large driving force can be transmitted at a low speed.

Figure 4:
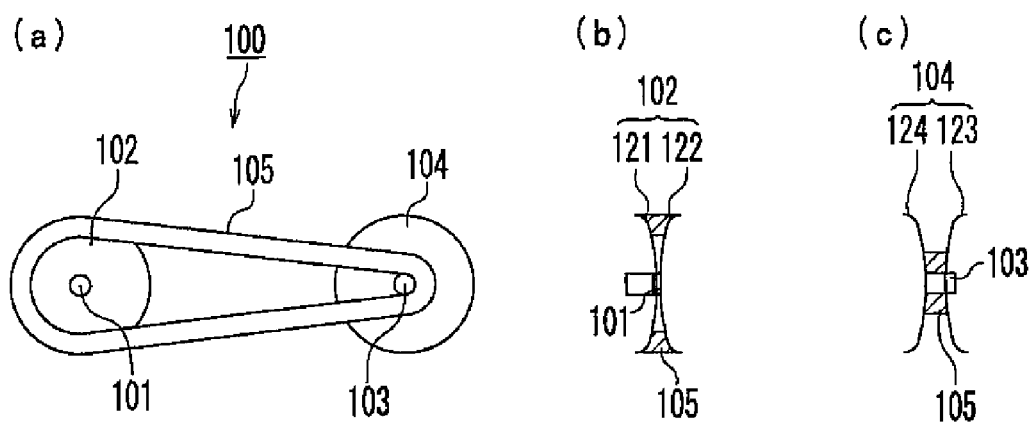
FIG. 4(a) shows the continuously variable transmission at a top gear position (Top)
FIG. 4(b) shows the primary sheave thereof.
FIG. 4(c) shows the secondary sheave thereof.

FIG. 4(a) shows continuously variable transmission 100 in a top or high gear (Top) state. In primary sheave 102, as shown in FIG. 4(b), the distance between fixed flange 121 and movable flange 122 is narrowed, and V-belt 105 is positioned at the outer circumferential location of primary sheave 102. In secondary sheave 104, as shown in FIG. 4(c), the distance between fixed flange 123 and movable flange 124 is widened, and V-belt 105 is positioned at the inner circumferential location of secondary sheave 104 (in the vicinity of secondary shaft 103). Under this condition, the rotation of primary shaft 101 is accelerated and transmitted to secondary shaft 103. Continuously variable transmission 100 thus is in a state such that relatively small driving force can be transmitted at a high speed.

The groove width of primary sheave 102 is adjusted by being driven by motor 106 so that a gear ratio is adjusted. Motor 106 operates in accordance with a target value setting program previously set in control device 107. A kick down operation is an operation that realizes a shift down movement in accordance with the rider's intention. The kick down operation is achieved based upon a preset target value setting program (kick down mode).

The inventors found that slips between primary sheave 102 and V-belt 105 may occur if deceleration is made when the kick down mode is executed, and analyzed the causes thereof. As a result, the inventors determined the causes of the problem to be as follows:

First, when the kick down mode is executed, the gear ratio of continuously variable transmission 100 is set to be in a Low gear range that is low in comparison with a state in which a normal mode is executed. When the gear ratio is set to be in the Low gear range, the groove width of primary sheave 102 is widened (see FIG. 3(b)) and the force with which primary sheave 102 pinches V-belt 105 is small in comparison with that in the higher or Top gear range in which the groove width of primary sheave 102 is narrow, as shown in FIG. 4(b). Also, under the deceleration condition, an accelerator is released and the throttle valve is closed. As shown in FIG. 1, in the throttle fully closed state, torque is transmitted from drive wheel 114 to primary shaft 101 sequentially through secondary shaft 103, secondary sheave 104, V-belt 105 and primary sheave 102 to make the engine brake action. In this regard, the term "throttle fully closed state" means the state in which the throttle valve of the engine is closed.

Accordingly, if the throttle valve is closed when the kick down mode is executed, the engine brake action is made. Because of the engine brake action, the force with which primary sheave 102 pinches V-belt 105 is small in comparison with the torque transmitted to primary shaft 101 from drive wheel 114. The inventors concluded that this phenomenon is a major cause of slips between primary sheave 102 and V-belt 105 under the deceleration condition.

Further, in a continuously variable transmission having a so-called multistage kick down mode in which multiple stages of the kick down mode are sequentially set at Low gear positions, the kick down mode can be further continuously executed when the deceleration is made by closing the throttle valve.

In this regard, when the kick down mode is executed, the groove width of primary sheave 102 is further widened. Primary sheave 102 and V-belt 105 thus are more slippery. The inventors supposed that the cause of the slips between primary sheave 102 and V-belt 105 is as discussed above.

The inventors determined that it was advantageous to reduce the slips between primary sheave 102 and V-belt 105 in order to enhance the rider's feeling, and to provide improved operability and stable running performance.

The inventors made various modifications for reducing the slips between primary sheave 102 and V-belt 105 based upon the above analyses.

A modification of a continuously variable transmission in accordance with one embodiment of the present invention is now described.

Continuously variable transmission 100 is mounted to straddle type vehicle 1000. As shown in FIG. 2, straddle type vehicle 1000 has an acceleration operator 131 and a kick down operator 132.

Acceleration operator 131 allows the rider to control the output of engine 108 and is formed with an accelerator or accelerator grip attached to handle bars. As shown in FIG. 1, control device 107 controls an opening of throttle valve 111 in response to operation of acceleration operator 131 to control the output of engine 108.

Kick down operator 132 is provided separately from acceleration operator 131 and is operated by the rider to execute the kick down mode that sets a gear range lower than in the normal mode. Kick down operator 132 is formed with a kick down (KD) button positioned at a location on the handle bars to be easily operated by the rider. Control device 107 executes the kick down mode in response to operation of kick down operator 132.

As shown in FIG. 1, continuously variable transmission 100 is connected to engine 108 and is controlled by control device 107. A normal mode in which a control target value is set, a kick down mode in which the control target value is set to be in a Low gear range lower than in the normal mode, and a restriction value given in a throttle fully closed state are provided in control device 107. Control device 107 has a target value setting section 140 which sets the control target value. The normal mode, the kick down mode and the restriction value are individually provided in target value setting section 140.

Control device 107 may be embodied in a microcomputer including a CPU, a ROM, a RAM, a timer, etc. A storage section stores data and programs and a processing section executing processes, such as a calculation process, in accordance with the programs. Target value setting section 140 is provided in the storage section of control device 107.

Various sensors such as a throttle opening sensor 151, an engine rotation sensor 152, a secondary sheave rotation sensor 153 and a vehicle speed sensor 154 are attached to straddle type vehicle 1000. Control device 107 is electrically connected to these sensors and obtains necessary information regarding various conditions of the straddle type vehicle from the respective sensors.

Throttle opening sensor 151 is positioned near a support shaft of throttle valve 111 and detects a throttle opening which is a rotational angle of throttle valve 111. Engine rotation sensor 152 is positioned near the crankshaft (primary shaft 101) of engine 108 and detects an engine rotational speed. Secondary sheave rotation sensor 153 is positioned near secondary shaft 103 and detects a rotational speed of secondary sheave 104. Vehicle speed sensor 154 is disposed on a drive axle of drive wheel 114 and detects a rotational speed of the drive axle of drive wheel 114. The vehicle (running) speed is calculated based on the rotational speed detected by vehicle speed sensor 154. A gear ratio of continuously variable transmission 100 is calculated as a ratio of the engine rotational speed detected by engine rotation sensor 152 to the vehicle speed detected by vehicle speed sensor 154.

Target value setting section 140 sets a target value for controlling continuously variable transmission 100. Target value setting section 140 stores normal mode 141, kick down mode 142 and restriction value 143.

Normal mode 141 is a target value setting program which sets a control target value for controlling continuously variable transmission 100 in a normal running state in which kick down mode 142 is not executed. Kick down mode 142 is a target value setting program which sets a control target value for controlling continuously variable transmission 100 to be in a Low gear range lower than in normal mode 141.

The target value setting programs provide the control target values based upon information of the vehicle obtained from throttle opening sensor 151, engine rotation sensor 152, secondary sheave rotation sensor 153, vehicle speed sensor 154, etc. Control device 107 operates motor 106 based upon the control target values to control the groove width of primary sheave 102.

In kick down mode 142 a control target value made by multiplying a gear shift characteristic (gear ratio) of normal mode 141 by a constant rate is set. Specifically, a control target value made by multiplying the control target value of the engine rotational speed set in normal mode 141 by a preset constant rate is set.

Restriction value 143 is a control target value of continuously variable transmission 100 set in the throttle fully closed state.

Restriction value 143 is previously decided in consideration of the effect that reduces slips between primary sheave 102 and V-belt 105 made by the engine brake action. Restriction value 143 is not limited to a particular value. For example, restriction value 143 can be set such that absolutely no slip occurs between primary sheave 102 and V-belt 105 by the engine brake action. Restriction value 143 is may be set in consideration of, for example, simulation results or actual vehicle tests.

Figure 5:
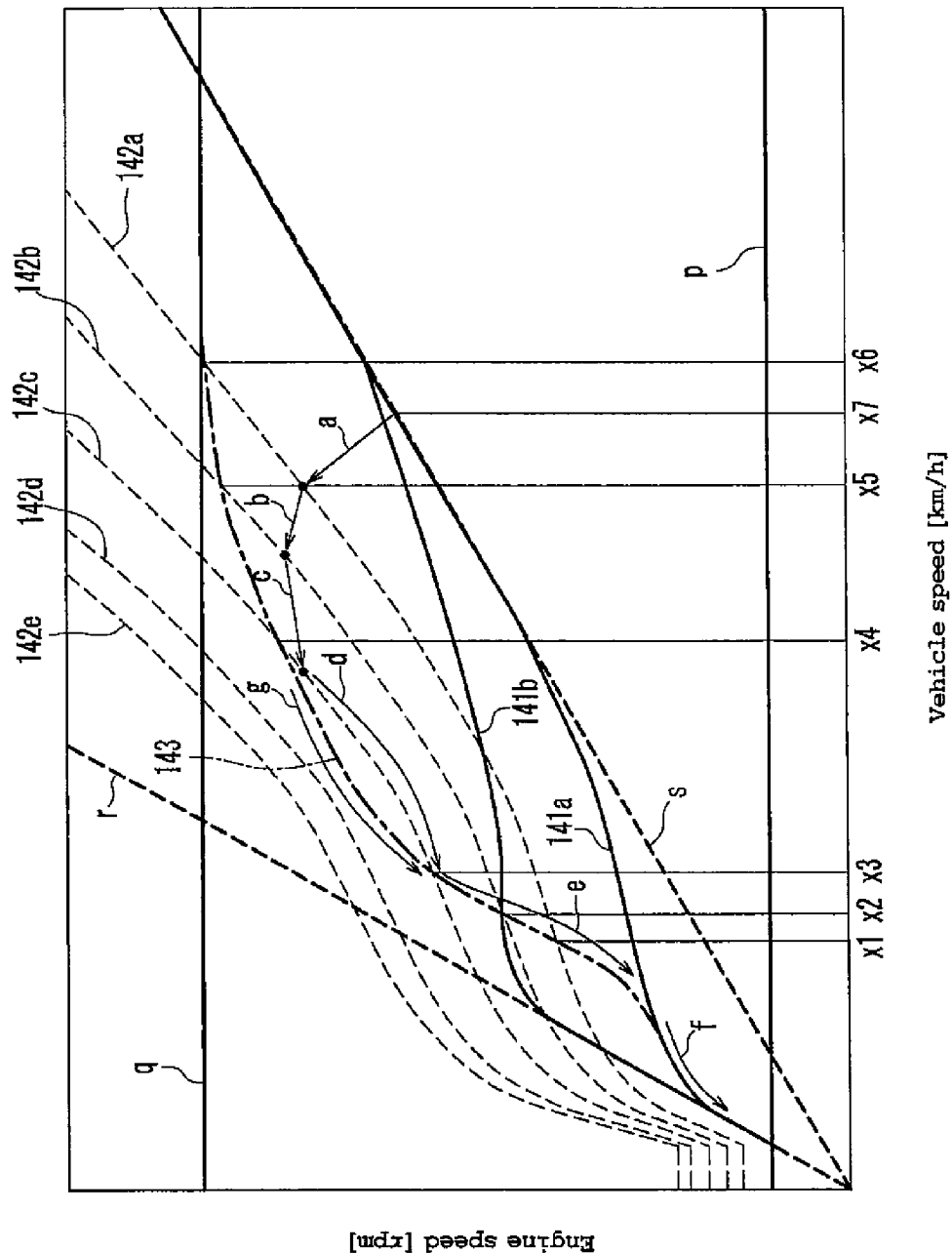
FIG. 5 shows a target value setting program (map) set in a control device of the continuously variable transmission.

FIG. 5 shows relationships of normal mode 141, kick down mode 142 and restriction value 143 with vehicle speeds and the speeds of engine 108.

The vertical axis of FIG. 5 indicates engine rotational speeds in revolutions per minute (rpm) and the horizontal axis indicates vehicle speeds in kilometers per hour (km/h). Reference symbol 'p' indicates the lower limit of engine rotational speed, and reference symbol 'q' indicates the upper limit of engine rotational speed. Reference symbol 'r' indicates relationships between vehicle speeds and engine rotational speeds when the groove width of primary sheave 102 is set to the lowest position in the Low gear range, and reference symbol 's' indicates relationships between vehicle speeds and engine rotational speeds when the groove width of primary sheave 102 is set to the highest position in the Top gear range. The rotational speed of engine 108 is detected (calculated) based upon, for example, a detection signal of engine rotation sensor 152. The vehicle speed is detected (calculated) based upon, for example, a detection signal of secondary sheave rotation sensor 153 or of vehicle speed sensor 154.

Reference numeral 141a indicates control target values in the normal mode in the throttle fully closed state. Reference numeral 141b indicates control target values in the normal mode in a throttle fully open state. Reference numerals 142a-142e indicate control target values in the kick down mode in the throttle fully closed state. Reference numeral 143 indicates restriction values in the throttle fully closed state.

In FIG. 5, multiple (five) stages of the kick down mode are set. A first mode 142a, a second mode 142b, a third mode 142c, a fourth mode 142d and a fifth mode 142e are sequentially set in the Low gear range. In FIG. 5, if the vehicle speeds are the same, the higher the engine rotational speed is, the lower the gear ratio of the continuously variable transmission is set. If the engine rotational speeds are the same, the lower the vehicle speed is, the lower the gear ratio of the continuously variable transmission is set.

Control device 107 controls continuously variable transmission 100 based upon kick down mode 142 provided in target value setting section 140, in response to operation of kick down operator 132. In the throttle fully closed state, control device 107 controls continuously variable transmission 100 not to exceed restriction value 143 provided in target value setting section 140. In order to execute the controls, as shown in FIG. 1, control device 107 has programs for executing a first control 161 and a second control 162.

First control 161 controls continuously variable transmission 100 along restriction values 143 in the throttle fully closed state, when kick down mode 142 sets control target values to a Low gear range lower than restriction values 143.

Figure 6:
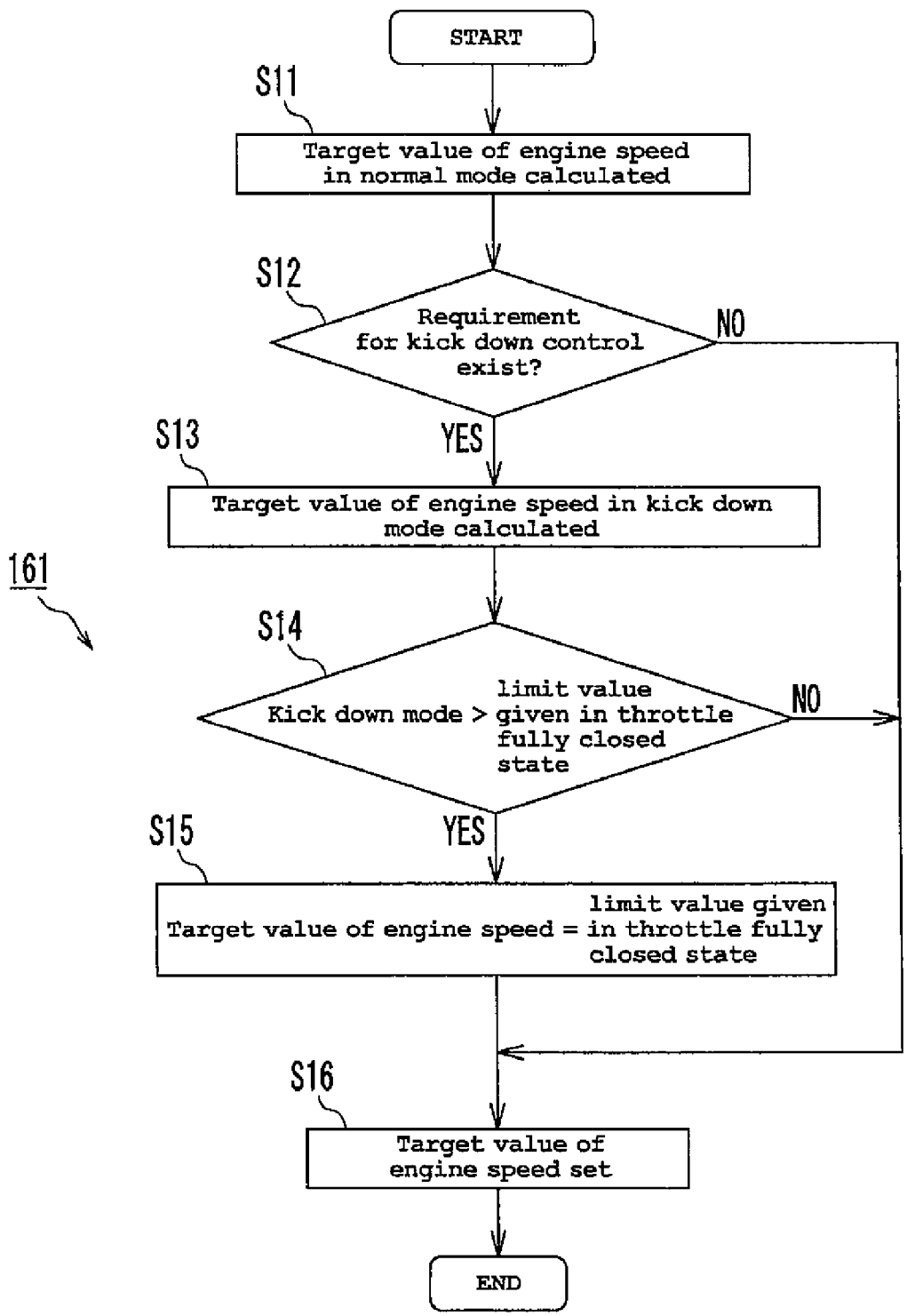
FIG. 6 is a flowchart showing a first control of the continuously variable transmission.

As shown in FIG. 6, a control target value of engine rotational speed is first calculated based upon normal mode 141a in the throttle fully closed state (S11). Next, it is determined whether any requirement for kick down control given through kick down operator 132 exists or not (S12). If there is no kick down control requirement, the control target value of the engine rotational speed of normal mode 141a in the throttle fully closed state is set to be the target value of the engine rotational speed (S16). If step S12 determines that there is a kick down control requirement, the control target value of the engine rotational speed is calculated based upon kick down mode 142 (S13).

As shown in FIG. 6, first control 161 includes a determination step S14 to determine whether or not the control target value of the engine rotational speed of kick down mode 142 calculated at step S13 is greater than the control target value of the engine rotational speed within restriction values 143 in the throttle fully closed state. In other words, it is determined whether or not kick down mode 142 sets the control target value of continuously variable transmission 100 to a Low lower gear range than restriction value 143.

If the calculated target value of engine speed in kick down mode is greater than the limit (restriction) value given in the throttle fully closed state, restriction value 143 is set to be the control target value of the engine rotational speed (S15). That is, if the outcome of determination step S14 is YES, restriction value 143 is set to be the control target value of the engine rotational speed (S15). If the calculated target value is not greater than the restriction value, the control target value of the engine rotational speed set by kick down mode 142 is set to be the control target value of the engine rotational speed (S16).

According to first control 161, in the throttle fully closed state, even though kick down mode 142 is executed, the control target value is set along restriction values 143 when kick down mode 142 sets the control target value to a Low gear range lower than restriction value 143. As a result, the control target value is not set to a gear range lower than restriction value 143 in the throttle fully closed state, and slips between primary sheave 102 and V-belt 105 during deceleration are reduced.

Second control 162 is now described.

Second control 162 is employed when multiple stages of kick down mode 142 are set and each stage of kick down mode 142 set at one of the Low gear positions is sequentially executed in response to the operation of kick down operator 132.

In the throttle fully closed state, second control 162 restricts kick down control when the control target value set by kick down mode 142 is positioned in a Low gear range lower than restriction value 143.

Figure 7:
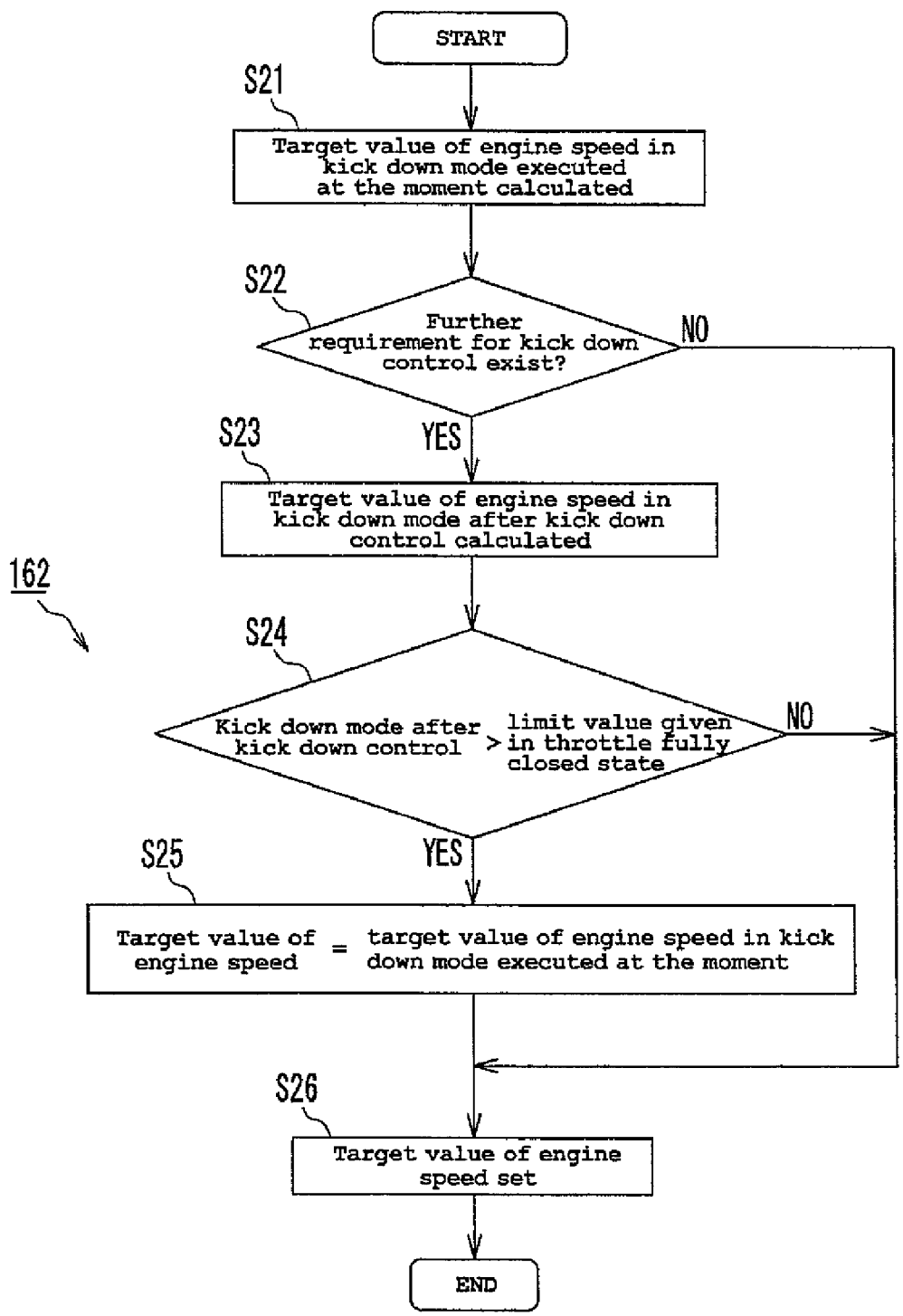
FIG. 7 is a flowchart showing a second control of the continuously variable transmission.

Second control 162 is executed when kick down operator 132 is further operated under the condition that the kick down mode is executed. As shown in FIG. 7, second control 162 first calculates a control target value of engine rotational speed based upon the kick down mode that is executed (S21). Next, it is determined whether or not any further requirement of kick down control given through kick down operator 132 exists (S22). If no further requirement of kick down control exists, the control target value of engine rotational speed of the kick down mode calculated at step S21 is set to be the control target value of the engine rotational speed as it is (S26). If a further requirement of the kick down control exists, the control target value of the engine rotational speed is calculated based upon the kick down mode provided after the kick down control (S23). The processes discussed above are the same as the normal multistage kick down control.

As shown in FIG. 7, second control 162 includes determination step S24 that determines whether or not the control target value of the engine rotational speed of the kick down mode calculated at step S23 is greater than restriction value 143 in the throttle fully closed state. In other words, determination step S24 determines whether or not the kick down mode sets the control target value to a Low gear range lower than restriction value 143.

If the control target value is greater than restriction value 143, kick down control is restricted at step S25. That is, if the outcome of determination step S24 is YES, kick down control is restricted.

If the control target value is not greater than restriction value 143, the control target value of the engine rotational speed of kick down mode 142 is set to be the control target value of the engine rotational speed (S26). That is, if at the outcome of determination step S24 is NO, kick down control is not restricted and is made in response to the operation of the kick down operator.

The second control restricts, for example, deceleration when the rider closes the throttle valve to decelerate the straddle type vehicle and further operates kick down operator 132 continuously multiple times to make the engine brake action.

Second control 162 avoids setting the control target value to a Low gear range lower than restriction value 143 (or, in other words, an engine rotational speed higher than restriction value 143). Therefore, continuously variable transmission 100 is controlled not to vary the Low gear range lower than restriction value 143 in the throttle fully closed state, and slips between primary sheave 102 and V-belt 105 are more surely reduced.

Control by control device 107 is now specifically described.

As shown in FIG. 5, first mode 142a of the kick down is set to be in a Top gear range higher than restriction value 143, in a vehicle speed range of x1-x6 (km/h). However, out of the range of x1-x6 (km/h), first mode 142a is set to be in a Low gear range lower than restriction value 143.

Second mode 142b of the kick down is set to be in a Top gear range higher than restriction value 143, in a vehicle speed range of generally x2-x5 (km/h). However, out of the range of generally x2-x5 (km/h), second mode 142b is set to be in a Low gear range lower than restriction value 143.

Third mode 142c of the kick down is set to be in a Top gear range higher than restriction value 143, in a vehicle speed range of generally x3-x4 (km/h). However, out of the range of generally x3-x4 (km/h), third mode 142c is set to be in a Low gear range lower than restriction value 143.

Fourth mode 142d and fifth mode 142e of the kick down are set to be in a Low gear range lower than restriction value 143 in the entire range.

Also, as shown in FIG. 5, restriction value 143 is set to be in a Top gear range higher than the target values set by kick down modes 142a-142e provided in the throttle fully closed state at vehicle speeds slower than a preset vehicle speed x1.

For example, a situation is considered in which normal mode 141 is executed, and the rider closes the throttle valve to decelerate from a condition under which straddle type vehicle 1000 runs at a speed of x7 (km/h) between speeds of x5 and x6 and operates kick down operator 132 continuously multiple times.

On this occasion, if kick down modes (142a-142e) executed by the kick down control are in a Low gear range lower than restriction values 143, kick down control is restricted.

Specifically, when normal mode 141 is executed and kick down operator 132 is operated at the speed of x7 (km/h), first mode 142a is not in a Low gear range lower than restriction value 143. Therefore, kick down control is executed as indicated by arrow "a" without being restricted by second control 162 and first mode 142a of the kick down is executed.

Afterwards, when first mode 142a is executed, second mode 142b of the kick down is in a Low gear range lower than restriction value 143, at speeds faster than x5 (km/h). Therefore, at speeds faster than x5 (km/h), the kick down control from first mode 142a to second mode 142b is restricted by second control 162 even though kick down operator 132 is operated.

However, when deceleration is further made and the vehicle speed is reduced below x5 (km/h), second mode 142b is no longer in a Low gear range lower than restriction value 143. Therefore, if kick down operator 132 is operated, kick down control from first mode 142a to second mode 142b is executed as indicated by arrow "b" without being restricted by second control 162.

Similarly, when second mode 142b is executed, second mode 142b of the kick down is in a Low gear range lower than restriction value 143, at speeds faster than t x4 (km/h). Therefore, at speeds faster than x4 (km/h), the kick down control from second mode 142b to third mode 142c is restricted by second control 162 even though kick down operator 132 is operated.

However, when deceleration is further made and the vehicle speed is reduced below x4 (km/h), third mode 142c is no longer in a Low gear range lower than restriction value 143. Therefore, if kick down operator 132 is operated, kick down control from second mode 142b to third mode 142c is executed as indicated by the arrow c without being restricted by second control 162.

As thus described, the respective kick down modes in the Low gear range are sequentially executed in response to operation of kick down operator 132. However, fourth mode 142d and fifth mode 142e are set to be in a Low gear range lower than the restriction value in their entire range. Therefore, kick down control from third mode 142c to fourth mode 142d is restricted by second control 162 even though kick down operator 132 is operated. Thus, straddle type vehicle 1000 is decelerated under the condition that third mode 142c is executed as indicated by arrow "d."

Also, in this embodiment, control device 107 controls continuously variable transmission 100 based upon restriction value 143 if kick down mode 142 is in a Low gear range lower than restriction value 143 given in the throttle fully closed state when first control 161 closes the throttle valve to decelerate the vehicle.

In the example discussed above, straddle type vehicle 1000 is decelerated under the condition that third mode 142c is executed as indicated by arrow "d," and, at the speed of x3 (km/h), third mode 142c is in a Low gear range lower than restriction value 143.

Therefore, when the vehicle is decelerated below the speed of x3 (km/h) under the condition that third mode 142c is executed, continuously variable transmission 100 is compulsorily controlled by first control 161 along restriction values 143 given in the throttle fully closed state, as indicated by arrow "e."

As thus described, when the throttle valve is closed to decelerate the vehicle, continuously variable transmission 100 is controlled to avoid being in a Low gear range lower than restriction value 143. Thereby, slips between primary sheave 102 and V-belt 105 of continuously variable transmission 100 under the deceleration condition can be prevented.

Also, in this embodiment, restriction value 143 given in the throttle fully closed state is set to be in a Top gear range higher than the control target value set by kick down modes 142a-142e provided in the throttle fully closed state, at speeds slower than x1 (km/h). Thereby, control of continuously variable transmission 100 without the kick down mode being executed is avoided, when the throttle valve is closed to decelerate, at speeds slower than x1 (km/h). Thereby, the continuously variable transmission is not shifted to a Low gear range at speeds slower than x1 (km/h), and slips of the belt can be prevented.

Additionally, the speed at which restriction value 143 is set to be in a Top gear range higher than kick down modes 142a-142e provided in the throttle fully closed state is a speed suitable for restricting an extreme down shift movement which can be made when the throttle valve is closed to decelerate. Preferably, restriction value 143 is set to be in a Top gear range higher than kick down modes 142a-142e provided in the throttle fully closed state.

As described above, in this embodiment, target value setting section 140 that sets a control target value for controlling the continuously variable transmission has restriction values 143 given in the fully closed state. Continuously variable transmission 100 is controlled so that the target value is not in a Low gear range lower than the associated restriction value 143, in the throttle fully closed state.

Specifically, in the throttle fully closed state, first control 161 restricts the target value when kick down modes 142a-142e set the control target value to be in a Low gear range lower than restriction value 143. First control 161 sets the control target value of continuously variable transmission 100 along restriction values 143 previously decided. Also, second control 162 properly controls the kick down control to be executed in response to operation of the kick down operator. That is, second control 162 restricts kick down control when the control target value set by the kick down mode is in a Low gear range lower than restriction value 143. Thereby, in the throttle fully closed state, continuously variable transmission 100 can be controlled so that the control target value is not set to a Low gear range lower than the restriction value. Because of such controls, slips between primary sheave 102 and V-belt 105 made under the deceleration condition are reduced.

Additionally, in the embodiment described above, second control 162 can be modified as follows:

In the embodiment described above, when second control 162 restricts kick down control, the kick down mode executed at the moment sets the control target value of continuously variable transmission 100. Alternatively, when second control 162 restricts kick down control, the control target value can be set along restriction values 143.

A control according to the modified example in FIG. 5 functions if the kick down operator is operated when the throttle valve is closed to decelerate the vehicle so that the speed thereof is generally slower than the speed x4 (km/h) under the condition, for example, that third mode 142c of the kick down is executed. In second control 162, kick down control is restricted and third mode 142c is continuously executed to make the control indicated by arrow d. Contrary to the control, in the modified example, the control target value is set along restriction value 143, as indicated by arrow g. Thereby, continuously variable transmission 100 is controlled to be at the lowermost position in the Low gear range. The requirement of the shift down movement by the rider thus can be realized.

In this embodiment, as shown in FIG. 1 and as described above, continuously variable transmission 100 has clutch 113 (centrifugal clutch) that is disengaged at a preset speed. In this regard, the inventors found the following.

In normal mode 141a, generally, continuously variable transmission 100 is controlled such that extreme down shift movement causing slips between primary sheave 102 and V-belt 105 is not made. Therefore, restriction value 143 is set to be in a Low gear range lower than in normal mode 141a provided in the throttle fully closed state.

If the vehicle runs in the normal mode when the throttle valve is closed to decelerate, continuously variable transmission 100 is controlled in accordance with normal mode 141a provided in the throttle fully closed state. To the contrary, if the vehicle runs in the kick down mode when the throttle valve is closed to decelerate, first control 161 and second control 162 are executed as discussed above. Therefore, at the speed where clutch 113 is disengaged (in this embodiment, approximately 20 km/h), continuously variable transmission 100 is controlled along restriction values 143.

Therefore, when the throttle valve is closed to decelerate, the controls for continuously variable transmission 100 and engine brake actions are different when the vehicle runs in the normal mode from when the vehicle runs in the kick down mode. Particularly, the engine brake action suddenly disappears at the moment that clutch 113 is disengaged.

Thus, if it is assumed that there is a large difference between the control target value set by normal mode 141a provided in the throttle fully closed state and restriction value 143 in the vicinity of the moment at which clutch 113 is disengaged, a great difference appears in the sense transferred to the rider when clutch 113 is disengaged between the situation in which the vehicle runs in the kick down mode and the situation in which the vehicle runs in the normal mode.

Such a difference may cause the rider to feel unnecessary discomfort.

Thus, the inventors made a modification which eliminates the discomfort and enhances the ride feeling of the straddle type vehicle. The modification is also applied to the embodiment shown in FIG. 5.

In the embodiment described above, as indicated by arrow f of FIG. 5, restriction value 143 is set to be generally identical with the target value set by normal mode 141a provided in the throttle fully closed state, in the vicinity of the vehicle speed at which clutch 113 is disengaged (in this embodiment, approximately 20 km/h).

Thereby, the control target values of continuously variable transmission 100 are generally consistent with each other in the vicinity of the vehicle speed at which clutch 113 is disengaged both when the vehicle runs in the kick down mode and when the vehicle runs in normal mode 141. Therefore, the sense transferred to the rider when clutch 113 is disengaged is always the same, and the rider does not feel any discomfort.

Additionally, the vehicle speed at which clutch 113 is disengaged varies depending on models. Thus, the vehicle speed at which restriction value 143 given in the throttle fully closed state is consistent with the control target value set by normal mode 141a provided in the throttle fully closed state is preferably properly adjusted. Also, it is preferable that the sense transferred to the rider when clutch 113 is disengaged is always the same. Therefore, preferably, restriction value 143 given in the throttle fully closed state is consistent with the control target value of continuously variable transmission 100 set by normal mode 141a provided in the throttle fully closed state at a vehicle speed at least between a vehicle speed which is slightly faster than the vehicle speed at which clutch 113 is disengaged and the very vehicle speed at which clutch 113 is disengaged. Also, in this connection, it is satisfactory that restriction value 143 and the control target value of continuously variable transmission 100 set by normal mode 141a provided in the throttle fully closed state are consistent with each other to the extent that the sense transferred to the rider when clutch 113 is disengaged is always the same.

A control device for a continuously variable transmission and a straddle type vehicle has been described in accordance with one embodiment of the present invention. However, the invention is not limited to this particular embodiment.

The normal mode, the kick down mode and the restriction value, all of which are set, are not limited to those exemplarily shown in FIG. 5. For example, a five-stage kick down mode is exemplarily shown. The multistage kick down mode, however, can have numbers other than five. Also, first control 161 and second control 162 can be applied to cases other than the multistage kick down mode.

Also, in the embodiment described above, the kick down mode that is set by multiplying the gear shift characteristic (gear ratio) of the normal mode by a constant rate is exemplarily shown. However, the setting of the kick down mode is not limited to this example.

In the embodiment described above, it is determined whether or not the kick down mode is in a Low gear range lower than the restriction value, referring to the control target value of the engine rotational speed. However, the determination as to whether or not the kick down mode is in a Low gear range lower than the restriction value is not limited to this determination. For example, it can be determined whether or not the kick down mode is in a Low gear range lower than the restriction value, referring to a control target value of the gear ratio of the continuously variable transmission set in the kick down mode and a control target value of the gear ratio of the continuously variable transmission set with the restriction value.

Also, some straddle type vehicles have two target value setting programs, i.e., a drive mode and an assist mode, as the normal mode, other than the kick down mode. The drive mode is a mode provided in consideration of fuel economy or the like, while the assist mode is the so-called sports mode in which the gear ratio is set to be in a Low gear range in comparison with the drive mode. In this case, the kick down mode can be additionally set in each of the drive mode and the assist mode. In such a case, slips between primary sheave 102 and V-belt 105 are also avoidable by providing restriction value 143 as described above.

Alternatively, the restriction value given in the throttle fully closed state can be, for example, a restriction value that is previously decided and stored. Further alternatively, a predetermined target value setting program (hereunder, called "restriction mode provided in the throttle fully closed state") which controls the continuously variable transmission along the restriction values can be set. In this alternative, the target value setting program (restriction mode provided in the throttle fully closed state) is preferably executed when the continuously variable transmission is controlled along the restriction values previously decided.

Although, as the straddle type vehicle, a scooter type motorcycle is exemplarily shown, the straddle type vehicle is not limited to such a vehicle. The continuously variable transmission of the present invention may be mounted on vehicles other than straddle type vehicles. The continuously variable transmission of the present invention can be mounted, for example, to vehicles such as an SSV (side by side vehicle) having seats for two riders.

The structure of the continuously variable transmission is not limited to the embodiment described above, and is applicable to various continuously variable transmissions having a configuration in which a V-belt is wound around a primary sheave and a secondary sheave and a groove width of the primary sheave is adjusted by an actuator and a control device.

Figure 8:
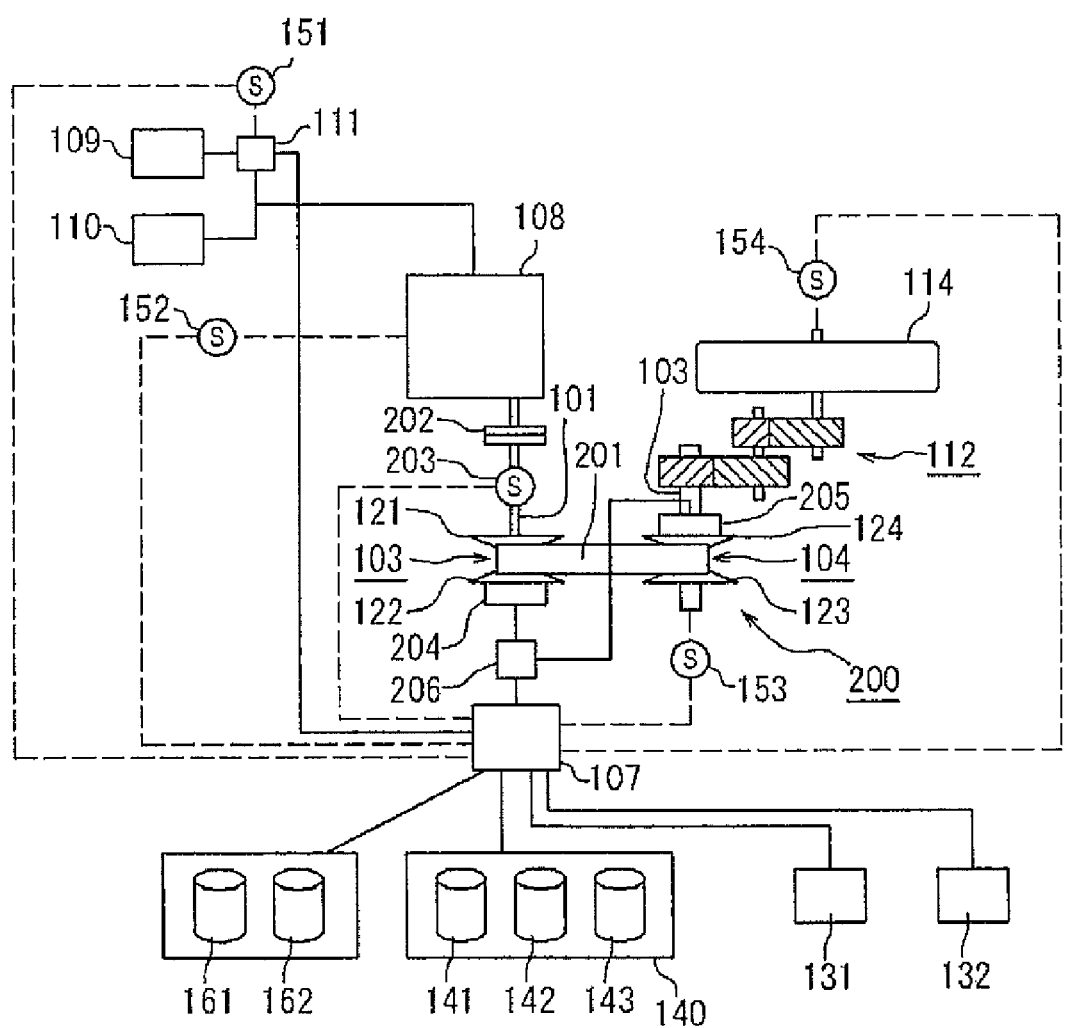
FIG. 8 shows a target value setting program (map) set in a control device of a continuously variable transmission of another embodiment of the present invention.

For example, as shown in FIG. 8, a continuously variable transmission may be provided having metal V-belt. In FIG. 8, elements that are the same as those of the continuously variable transmission of FIG. 1 are assigned with the same reference numerals.

A continuously variable transmission 200 with a metal V-belt (hereunder, called a "metallic belt CVT") has, as shown in FIG. 8, various modifications other than that the V-belt is a metal belt 201.

Metallic belt CVT 200 has a clutch 202, a primary rotation sensor 203, hydraulic cylinders 204, 205 and a hydraulic pressure control valve 206.

Clutch 202 is disposed between the output shaft of engine 108 and the input shaft of metallic belt CVT 200. The transmission of power is intercepted or permitted at a location between the output shaft of engine 108 and the input shaft of metallic belt CVT 200.

Next, primary rotation sensor 203 detects a rotational speed of primary 25, sheave 103. Control device 107 calculates a gear ratio of continuously variable transmission 200 as a ratio of the rotational speed of primary sheave 103 detected by primary rotation sensor 203 to the vehicle speed of straddle type vehicle 1000 detected by vehicle speed sensor 154. Additionally, the gear ratio of continuously variable transmission 200 can be calculated as a ratio of the rotational speed of primary sheave 103 detected by primary rotation sensor 203 to the rotational speed of secondary sheave 104 detected by secondary sheave rotational speed sensor 153.

Next, hydraulic cylinder 204 adjusts a groove width of primary sheave 103. Hydraulic cylinder 204 provides movable flange 122 with pressing force to adjust the groove width of primary sheave 103. Hydraulic cylinder 205 adjusts a groove width of secondary sheave 104. Hydraulic cylinder 205 provides movable flange 124 with pressing force to adjust the groove width of secondary sheave 104. Hydraulic pressure control valve 206 is a valve adjusting a hydraulic pressure provided to hydraulic cylinders 204, 205. When the hydraulic pressure of either one hydraulic cylinder 204 (205) of hydraulic cylinders 204, 205 is to be raised, hydraulic pressure control valve 206 controls the hydraulic pressure so that the hydraulic pressure of the other hydraulic cylinder 205 (204) is lowered. Hydraulic pressure 206 is controlled by control device 107.

In metallic belt CVT 200, the gear ratio of metallic belt CVT 200 is changed by operating hydraulic control valve 206 by control device 107 in accordance with the control target value that is set. Regarding controls by control device 107, the same controls as those of continuously variable transmission 100 are made. Additionally, in metallic belt CVT 200 of this embodiment, control device 107 uses the rotational speed of primary sheave 103 as the control target value instead of using the engine speed as the control target value.

As described above, the belt type continuously variable transmission according to the present invention can be widely used as a belt type continuously variable transmission for a straddle type vehicle.

The invention claimed is:

1. A continuously variable transmission comprising:
a control device for controlling a gear ratio of the continuously variable transmission; and
a kick down operator, wherein
the control device provides a normal mode in which a control target value is set, a kick down mode in which the control target value is set to be in a Low gear range lower than in the normal mode, and a restriction value given in a throttle fully closed state are provided in the control device,
the control device controls the continuously variable transmission based upon the kick down mode in response to an operation of the kick down operator, and
the control device controls the continuously variable transmission not to vary to a Low gear range lower than the restriction value in the throttle fully closed state.

2. The continuously variable transmission according to claim 1, wherein
the control device controls the continuously variable transmission along the restriction value when the kick down mode sets the control target value to the Low gear range lower than the restriction value, in the throttle fully closed state.

3. The continuously variable transmission according to claim 1, further comprising:
a clutch which is disengaged at a preset speed, wherein
the restriction value is set to be identical with the control target value set by the normal mode in the throttle fully closed state, in the vicinity of a vehicle speed at which the clutch is disengaged.

4. The continuously variable transmission according to claim 1, wherein
- the control device provides multiple stages of the kick down mode at which control target values are sequentially set at Low gear positions lower than in the normal mode,
- the control device makes a kick down control in which each stage of the kick down mode set at one of the Low gear positions in the multiple stages of the kick down mode is sequentially executed in response to operation of the kick down operator, and
- the control device makes a control in which the kick down control is restricted, when the control target value set by the kick down mode executed by the kick down control exists in a Low gear range lower than the restriction value, in the throttle fully closed state.

5. The continuously variable transmission according to claim 4, wherein the control device makes a control in which the kick down control is restricted and the gear ratio of the continuously variable transmission is controlled along the restriction value, when the control target value set by the kick down mode executed by the kick down control is in a Low gear range lower than the restriction value, in the throttle fully closed state.

6. A straddle type vehicle comprising:
- an engine;
- an accelerator operator for controlling the output of the engine;
- a continuously variable transmission connected to the engine,
- a control device controlling a gear ratio of the continuously variable transmission; and
- a kick down operator provided separately from the acceleration operator, wherein
- the control device provides a normal mode in which a control target value is set, a kick down mode in which the control target value is set to be in a Low gear range lower than in the normal mode, and a restriction value given in a throttle fully closed state,
- the control device controls the continuously variable transmission based upon the kick down mode in response to an operation of the kick down operator, and
- the control device controls the continuously variable transmission not to vary to a Low gear range more than the restriction value in the throttle fully closed state.

7. The straddle type vehicle according to claim 6, wherein
the control device controls the continuously variable transmission along the restriction value when the kick down mode sets the control target value to the Low gear range lower than the restriction value, in the throttle fully closed state.

8. The straddle type vehicle according to claim 6, wherein
the restriction value given in the throttle fully closed state is set to be in a Top gear range more than the control target value set by the kick down mode in the throttle fully closed state, at a vehicle speed slower than a preset vehicle speed.

9. The straddle type vehicle according to claim 6 further comprising:
- a clutch that is disengaged at a preset speed, wherein
- the restriction value is set to be identical with the control target value set in the normal mode in the throttle fully closed state, in the vicinity of a vehicle speed at which the clutch is disengaged.

10. The straddle type vehicle according to claim 6, wherein
- the control device provides multiple stages of the kick down mode at which control target values are sequentially set at Low gear positions lower than in the normal mode,
- the control device makes a kick down control in which each stage of the kick down mode is sequentially executed in response to operation of the kick down operator, and
- the control device makes a control in which the kick down control is restricted, when the control target value set by the kick down mode is in a Low gear range lower than the restriction value, in the throttle fully closed state.

11. The straddle type vehicle according to claim 10, wherein the control device makes a control in which the kick down control is restricted and the gear ratio of the continuously variable transmission is controlled along the restriction value, when the control target value set by the kick down mode executed by the kick down control is in a Low gear range lower than the restriction value, in the throttle fully closed state.

12. A method for controlling a continuously variable transmission, comprising:
- providing a normal mode in which a control target value is set; and
- providing a kick down mode in which the control target value is set to be in a Low gear range lower than in the normal mode, wherein
- when the kick down mode is carried out in a throttle fully closed state, the control target value is not set to be in a gear range below a predetermined restriction value.

\* \* \* \* \*